(12) United States Patent
Green

(10) Patent No.: US 8,145,470 B2
Green
(45) Date of Patent: Mar. 27, 2012

(54) ACCELERATED ACCESS DEVICE EMULATOR ACCESS SCHEME IN A HYPERVISOR ENVIRONMENT WITH CHILD AND ROOT PARTITIONS

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 11/769,510

(22) Filed: Jun. 27, 2007

(65) Prior Publication Data

US 2009/0006074 A1    Jan. 1, 2009

(51) Int. Cl.
G06F 9/455    (2006.01)
(52) U.S. Cl. .............................. 703/26; 718/1
(58) Field of Classification Search ......... 718/1; 703/26
See application file for complete search history.

(56) References Cited

U.S. PATENT DOCUMENTS

| | | | |
|---|---|---|---|
| 4,370,709 A | 1/1983 | Fosdick | 703/26 |
| 4,975,869 A | 12/1990 | Ammann et al. | 714/28 |
| 5,551,013 A | 8/1996 | Beausoleil et al. | 703/23 |
| 5,590,312 A * | 12/1996 | Marisetty | 703/23 |
| 5,636,375 A | 6/1997 | Miyoshi | 712/233 |
| 5,781,758 A | 7/1998 | Morley | 703/23 |
| 5,790,825 A | 8/1998 | Traut | 712/209 |
| 5,819,063 A | 10/1998 | Dahl et al. | 703/27 |
| 5,920,713 A | 7/1999 | Favor | 712/236 |
| 6,496,847 B1 * | 12/2002 | Bugnion et al. | 718/1 |
| 6,631,514 B1 | 10/2003 | Le | 717/137 |
| 6,944,699 B1 * | 9/2005 | Bugnion et al. | 710/269 |
| 7,475,002 B1 * | 1/2009 | Mann | 703/23 |
| 7,865,893 B1 * | 1/2011 | Omelyanchuk et al. | 718/1 |
| 2003/0093775 A1 * | 5/2003 | Hilton | 717/138 |
| 2005/0246453 A1 * | 11/2005 | Erlingsson et al. | 710/1 |
| 2008/0104586 A1 * | 5/2008 | Thorton et al. | 718/1 |

OTHER PUBLICATIONS

Canon et al., A Virtual Machine Emulator for Performance Evaluation, Feb. 1980, ACM, vol. 23, No. 2, pp. 71-80.*
Jeff Dike, A user-mode port of the Linux kernel, 2000, USENIX Association, vol. 4, pp. 1-7.*
Uhlig et al., Intel Virtualization Technology, May 2005, IEEE Computer Society, vol. 38, Issue 5, pp. 48-56.*
Draves et al., Using Continuations to Implement Thread Management and Communication in Operating Systems, Oct. 1991, ACM, pp. 122-136.*
Bhardwaj, R. et al., "A Choices Hypervisor on the ARM architecture," 2006, http://choices.cs.uiuc.edu/ChoicesHypervisor.pdf, 5 pages.
Biemüller, S., "Hardware-Supported Virtualization for the L4 Microkernel," *Diploma Thesis at Universität Karlsruhe*, 2006, 1-70.
Lagar-Cavilla, H.A. et al., "VMM-Independent Graphics Acceleration," 2007, 1-22.

* cited by examiner

*Primary Examiner* — Paul Rodriguez
*Assistant Examiner* — Bernard E Cothran
(74) *Attorney, Agent, or Firm* — Woodcock Washburn LLP

(57) ABSTRACT

A hypervisor environment configured for accelerated access to device emulators comprises a hypervisor that intercepts a device access instruction to a child partition processor and routes said device access instruction to a root partition. A processor instruction emulator emulates said device access instruction along with any number of next instructions of the processor in said child partition, thereby dispatching accesses to a device emulator on behalf of the processor in said child partition. By emulating these instructions in the root partition, accesses to the device emulator are greatly accelerated.

23 Claims, 4 Drawing Sheets

ACCELERATED ACCESS DEVICE EMULATOR ACCESS SCHEME IN A HYPERVISOR ENVIRONMENT WITH CHILD AND ROOT PARTITIONS

BACKGROUND

Major chip manufactureres, such as INTEL® and AMD®, have introduced hardware virtualization support features into their processors. At present, such hardware virtualization support features comprise, for example, hardware-based virtualization extensions that overcome the classical virtualization limitations of the x86 architecture. Products including these extensions are known as INTEL VT® and AMD-V®. Most modern x86 server-based and desktop-based processors presently include hardware virtualization support via these extensions. Software virtual machine technologies such as VIRTUAL PC® and VIRTUAL SERVER® made by MICROSOFT® Corp., and PARALLELS WORKSTATION® made by PARALLELS®, Inc., can leverage such hardware virtualization support features to make virtual machine technologies run faster.

However, the use of hardware virtualization support features can slow down, rather than speed up device access by a virtual machine in certain scenarios. For example, some previous virtual machine software made for previous x86 systems (those not including hardware virtualization support) used binary translation and/or patching to make code suitable for execution in a virtual machine. This was because the old virtual machine environment was not capable of perfectly representing the virtual machine—requiring a few changes to the child code to make the child code operate correctly in the virtual machine environment. While cumbersome, the binary translation and/or patching techniques were capable of achieving acceptably fast access to devices.

In contrast, present x86 virtual machine software technologies can leverage newer hardware virtualization features, as described above, and have no need for binary translation or patching because unmodified code can be made to run correctly in a virtual machine. Because there is no need for binary translation in general, the device access efficiency gains associated with the previous arrangement are lost. A different solution for speeding up device accesses is needed for systems comprising hardware virtualization support.

SUMMARY

In consideration of the above-identified shortcomings of the art, the present invention provides a computer system and corresponding method for accelerated access to device emulators in a hypervisor environment. A contemplated hypervisor environment comprises a child partition and a root partition comprising device emulators. Access from the child partition to the device emulators in the root partition are managed by the hypervisor. An exemplary computer system may comprise a processor that operates in said child partition, a hypervisor that intercepts a device access instruction to said processor and routes said device access instruction to said root partition, and at least one processor instruction emulator that operates in said root partition. The processor instruction emulator emulates said device access instruction along with any number of next instructions of the processor in said child partition, thereby dispatching accesses to a device emulator on behalf of the processor in said child partition. By emulating these instructions in the root partition, accesses to the device emulator are greatly accelerated. Other advantages and features of the invention are described below.

BRIEF DESCRIPTION OF THE DRAWINGS

The systems and methods for accelerated access to device emulators in a hypervisor environment in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
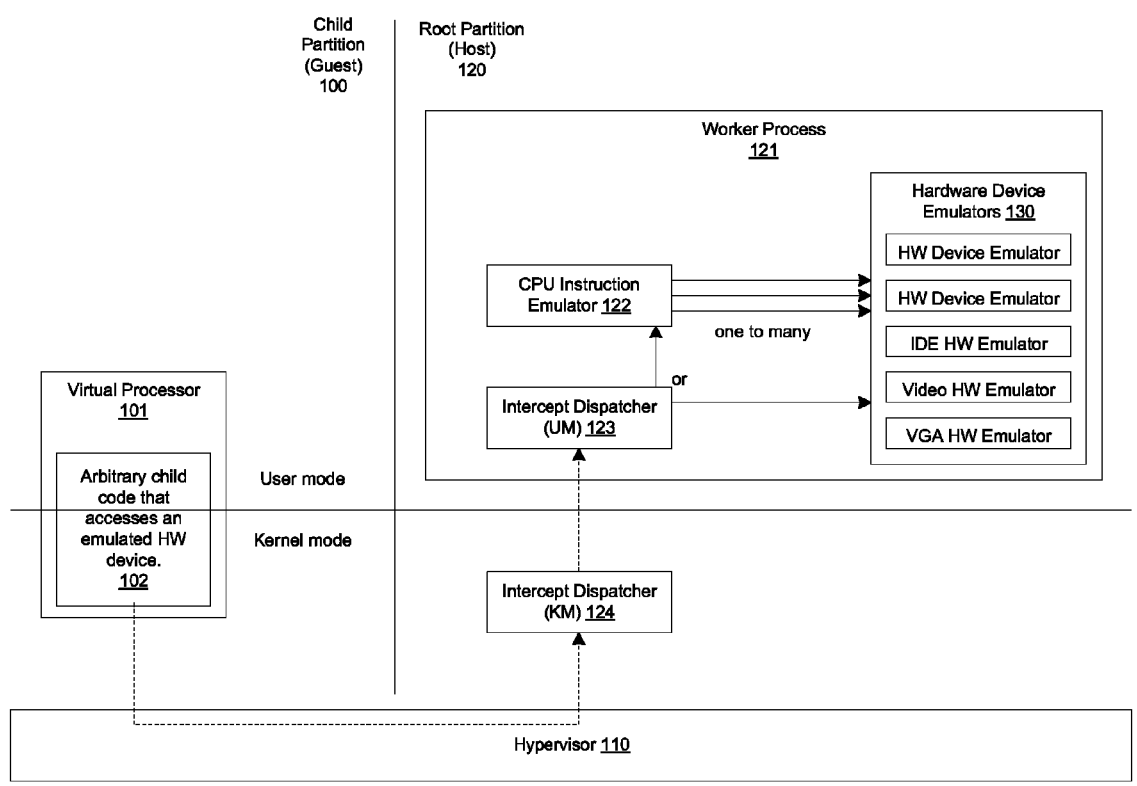
FIG. 1 illustrates a computer system configured for accelerated access, from a child partition, to a device emulator in a root partition.

Referring to FIG. 1, systems with hardware virtualization support handle virtual machine 100 accesses to emulated hardware devices 130 by "intercepting" to the hypervisor 110 on access by child code 102 to emulated hardware 130. The hypervisor 110 then handles the intercept by emulating the hardware access on behalf of the child virtual machine 100, and then resuming execution of the child virtual machine 100. This may be done by the hypervisor 110 itself or possibly handed off to software external to the hypervisor 110.

The child virtual machine 100 sees the emulated hardware device 130 as if it were a real device. One drawback of the hardware virtualization support is that an intercept into the hypervisor 110 is relatively time consuming, and a resume of the child virtual machine 100 is also relatively time consuming. The end result of the move to the newer virtualization technology is that less patching and less binary translation is required to run child code 102, and therefore the speed of CPU 101 and memory tasks is generally increased, but access to emulated hardware devices 130 is slower. This is due to the greater cost of taking an intercept into the hypervisor 110 and back as compared with running code in the VMM work area of previous systems, and returning from that.

This new performance problem while accessing emulated hardware 130 is most pronounced when the child code 102 accesses emulated hardware 130 many times in quick succession. These accesses can take the form of Input/Output (IO) port reads and writes, such as IN and OUT instructions, and variants thereof. They may also take the form of Memory Mapped IO (MMIO) accesses, such as any instruction that reads or writes memory that is backed by an emulated hardware device instead of real Random Access Memory (RAM) or a real hardware device. This new performance problem stems from the fact that there is a greater "distance" (in time) between execution of child Central Processing Unit (CPU) instructions 102 and the hardware device emulator 130.

As illustrated in FIG. 1, this distance (in time) between child code 102 and the hardware device emulators 130 can be reduced by emulating the child CPU instructions using a processor instruction emulator 122 that runs, for example, in a same context as the hardware device emulators 130. The processor instruction emulator 122 and the hardware device emulators 130 can run in a same context when they are both incorporated into a same user mode process such as worker process 121.

Because the processor instruction emulator 122 and the hardware device emulators 130 are running "right next to each other" in the same user mode process 121, there is very low cost incurred when a child CPU instruction specifies access to an emulated hardware device, if the child code is already running under the processor emulator 122. An important aspect of putting the CPU instruction emulator 122 right next to the hardware device emulators 130 is that the emulator 122 can continue to emulate several more child instructions after dispatching an access to an emulated hardware device. This allows another hardware access to be dispatched without paying the penalty to return to direct child code execution on 101, or the penalty for stopping direct execution on 101 again at the next access.

While emulation of child instructions is generally slower than directly executing them on 101, the time cost saved by not transitioning to and from direct execution on 101 more than makes up for the speed penalty paid during the actual execution of child instructions, as long as child instructions that access emulated hardware devices 130 are at a sufficiently high concentration relative to the number of instructions being executed overall. In fact, in some embodiments, even when as little as 1%, or one out of every 100 instructions comprises an access to device emulators 130, we have found that emulation is significantly faster under emulation by 122 than using continual transitions to and from direct execution by 101.

In one embodiment, heuristics may be used to determine whether direct execution on 101 or emulation by 122 is the most efficient execution mode for a virtual processor depending on the cost tradeoffs involved. The virtual processor is then moved to the execution mode that is determined to be most efficient by the heuristics.

In one embodiment, the CPU instruction emulator 122 parses instructions to processor 101 and saves the parsed results for faster emulation of already-parsed instructions. Emulator 122 also "flattens" or "unrolls" the instruction stream to a large degree. The emulator 122 achieves this flattening by filling in the parsed-instruction array as the instructions are parsed, in the order in which the instructions are executed rather than the order they are in the child's memory space. Only when the emulator 122 encounters a conditional branch instruction does the emulator 122 search for the target instruction pointer address in the list of already-parsed instructions. The parsed-instruction array is analogous to the output from a binary-translating execution engine, except that the output of the parsing step is interpreted rather than being directly executed.

In one embodiment, the processor instruction emulator 122 handles self-modifying code by discarding any parsed instructions and other data derived from instruction bytes previously read from a block of memory, just after emulating an instruction that modifies said block of memory. A block of memory can be any size and have any alignment, including the native size and alignment of memory pages.

In principle, the CPU instruction emulator 122 may use any emulation mechanism, including an optimizing binary translating execution engine. The approach is not limited to pure emulation.

Because the CPU instruction emulator 122 doesn't run in the same address space as the child code 102, accesses to child memory must be translated from child virtual address to child physical address, and the appropriate child physical address pages must be mapped into the virtual address space that the emulator 122 is using before the memory access can be performed by the emulator 122. In one embodiment, these mappings are cached.

In the case of virtual machine software technologies that support more than one virtual processor per virtual machine, the emulator 122 must be able to correctly execute instructions for one virtual processor using direct execution on a real CPU while simultaneously executing instructions for another virtual processor using the CPU instruction emulator 122. In this situation, the two virtual CPUs must still be able to robustly communicate via memory accesses to the same child physical addresses as if both virtual CPUs were directly executing on physical CPUs on the same machine. This means that any memory access performed by child code must have correct memory caching and locking semantics, including when the virtual processor is being emulated.

In one embodiment, the emulator 122 achieves this by operating directly on child physical pages, and by using the same underlying memory access as is specified by the child instruction being emulated. For example, if the child specifies a "lock inc" on a one-byte memory location, the emulator 122 performs a real one byte locked memory increment via the virtual address that maps onto the appropriate child physical memory page. This is different than many emulators which reduce all memory accesses to simple reads and writes, sometimes via cached memory contents, which would not work for multi-processor embodiments.

In one embodiment, the emulator 122 obtains and caches address translations and virtual to physical mappings (apertures) for portions of child memory. These portions of child memory are multiples of a memory page in length.

Embodiments may be advantageously configured to only cache translations and mappings for single pages, however caching of translations and mappings for longer portions of child virtual address space is also possible. The mappings may be structured so that contiguous emulator 122 virtual addresses map to contiguous child virtual addresses. This allows for shorter translation times once a virtual address correspondence and mapping has been established once.

In one embodiment, the emulator 122 loads the virtual processor state from the virtual processor 101 before beginning emulation, then maintains the virtual processor state internally, then after it is done emulating it pushes the virtual processor state back to the virtual processor 101 and resumes direct execution of the virtual processor on a real CPU.

The emulator need not be a "complete" emulator in that it need not emulate all the functions of processor 101. In such embodiments, any instruction, instruction variant, or CPU feature that isn't supported by the emulator 122 can cause the emulator 122 to "give up" when encountered. This "giving up" is implemented by returning the virtual processor to direct execution on 101 in a state just prior to encountering whatever is not supported by the emulator 122.

In a present implementation, the emulator 122 does not continue emulating forever, even if all encountered instructions are fully supported. The emulator 122 determines whether to leave the virtual processor in emulation mode or to return it to direct execution mode using heuristics tuned to balance the cost of emulation against the cost of transitioning to and from direct execution. For example, the emulator 122 may continue emulating for a specific amount of time in the absence of any emulated device accesses. There may be a maximum overall amount of time the emulator will continue emulating even if there are device accesses. There may be other heuristics also, such as heuristics that make use of profiling data collected from previous emulation runs or performance counters read from the physical CPU.

One unique aspect of the system illustrated in FIG. 1 is the "sidecar" nature of the emulator 122. The emulator 122 need not implement every CPU instruction and variant that is supported by the virtual machine execution environment, it need only recognize that it doesn't support a particular sequence of instruction bytes or scenario, and in those cases return to direct execution on 101 so that the particular case can be handled by the direct-execution mechanisms. This saves substantial development time while still providing substantial performance improvement for "typical" instructions and cases encountered.

In summary, with regard to FIG. 1, a computer system is illustrated that is configured for accelerated access, from guest operating system software and child software applications such as 102 executing in child partition 100, to a device emulator 130 in a root partition 120 in which a host operating system and various host applications may execute.

FIG. 1 provides a processor 101 that operates in said child partition 100. Here, the processor is illustrated as a virtual processor. It will be appreciated that virtual processor 101 may occasionally switch to a direct execution mode. Also, the virtual processor 101 can be supported by one or more physical processors and optionally passed from one physical processor to another.

A hypervisor 110 intercepts a device access instruction, such as an instruction that child code 102 would send to said processor 101. The hypervisor 110 has primary control over system hardware as is known in the art. The hypervisor 110 routes said device access instruction to said root partition 110. In the root partition 110, the intercept is routed by an intercept dispatcher that may be configured with a kernel mode 124 and a user mode 123. As illustrated, the intercept dispatcher 123 can route said device access instruction to said processor instruction emulator 122. Alternatively, in scenarios where processor emulation is unnecessary, the user mode dispatcher 123 can route instructions directly to an appropriate device emulator 130.

Finally, FIG. 1 illustrates at least one processor instruction emulator 122 that operates in said root partition 110, said processor instruction emulator 122 emulating said device access instruction, dispatching an access to a device emulator 130, and subsequently emulating at least one next instruction of said processor 101 that operates in said child partition 100. The subsequent emulation of a next instruction is done without returning execution to the processor 101, thereby saving the time it would pass information back and forth between 101 and 130.

In one embodiment the processor instruction emulator 122 shares an operating system context with said device emulator 130 by virtue of running in a same process 121 managed by the host operating system running in 110. For example, emulator 122 may run on a thread within process 121 and the emulator 122 may call device emulator 130 using that same thread. Thus arranged, no thread switching within process 121 is triggered due to communication between emulator 122 and device emulator 130.

The hardware device emulator in 130 can emulate any hardware device, and the invention is not limited to any particular device. It is likely to provide performance improvement for many hardware device emulators. In one embodiment, the device emulator comprises a VGA graphics display which may include emulation of VGA planar graphics modes. Other embodiments may comprise emulated Integrated Device Electronics (IDE) device interfaces, emulated video "accelerators", or any other hardware device.

Referring specifically to embodiments where device emulator 130 comprises an emulated planar VGA graphics device, these legacy graphics modes present a challenge because when a memory write is done to a VGA planar region, a subsequent read does not necessarily return what was written. The data is transformed on write and/or read depending on the setting of various planar-VGA-related registers. Because of this, the VGA planar region cannot be backed by real RAM (as can most of child 100 memory). Instead, the VGA planar region is backed by a big MMIO range, and reads and writes to this range are handled as if they were emulated hardware device register reads or writes. Simply clearing the screen and loading a new image in a legacy VGA planar graphics mode can generate tens of thousands of intercepts (that is, without the benefit of the systems and methods disclosed herein), which leads to very slow drawing while in these legacy graphics modes.

These legacy graphics modes are often necessary to support because they are used during boot of many operating systems, including every version of the popular WINDOWS® line of operating systems made by MICROSOFT® Corp. Using the system disclosed herein, the speed of these graphics modes is greatly increased. This decreases the time needed to boot many operating systems, and also speeds up any other situation in which these legacy graphics modes are used.

Figure 2:
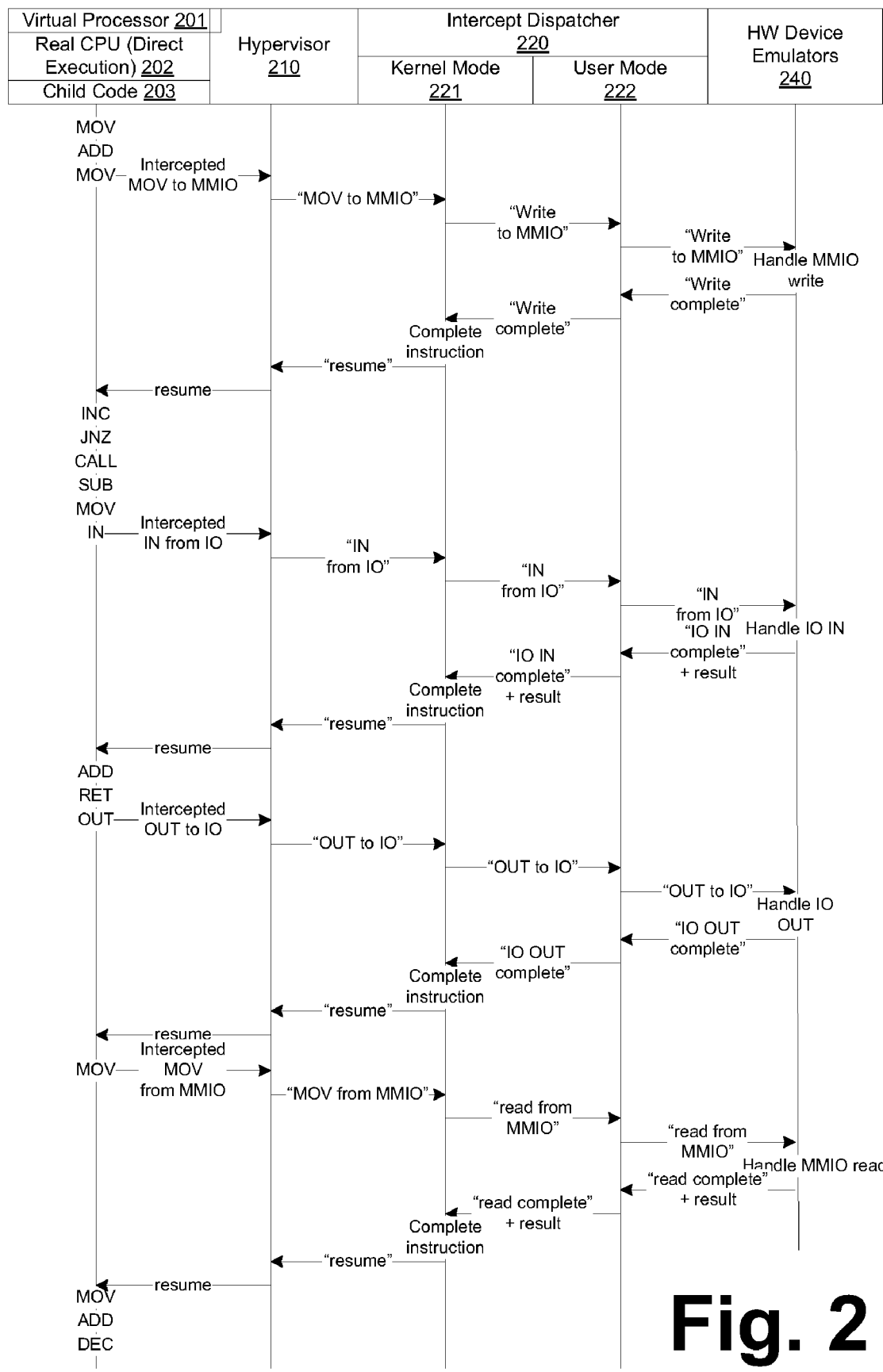
FIG. 2 illustrates an interaction diagram for a sequence of child instructions, without the use of an emulator 122 as illustrated in FIG. 1.
Figure 3:
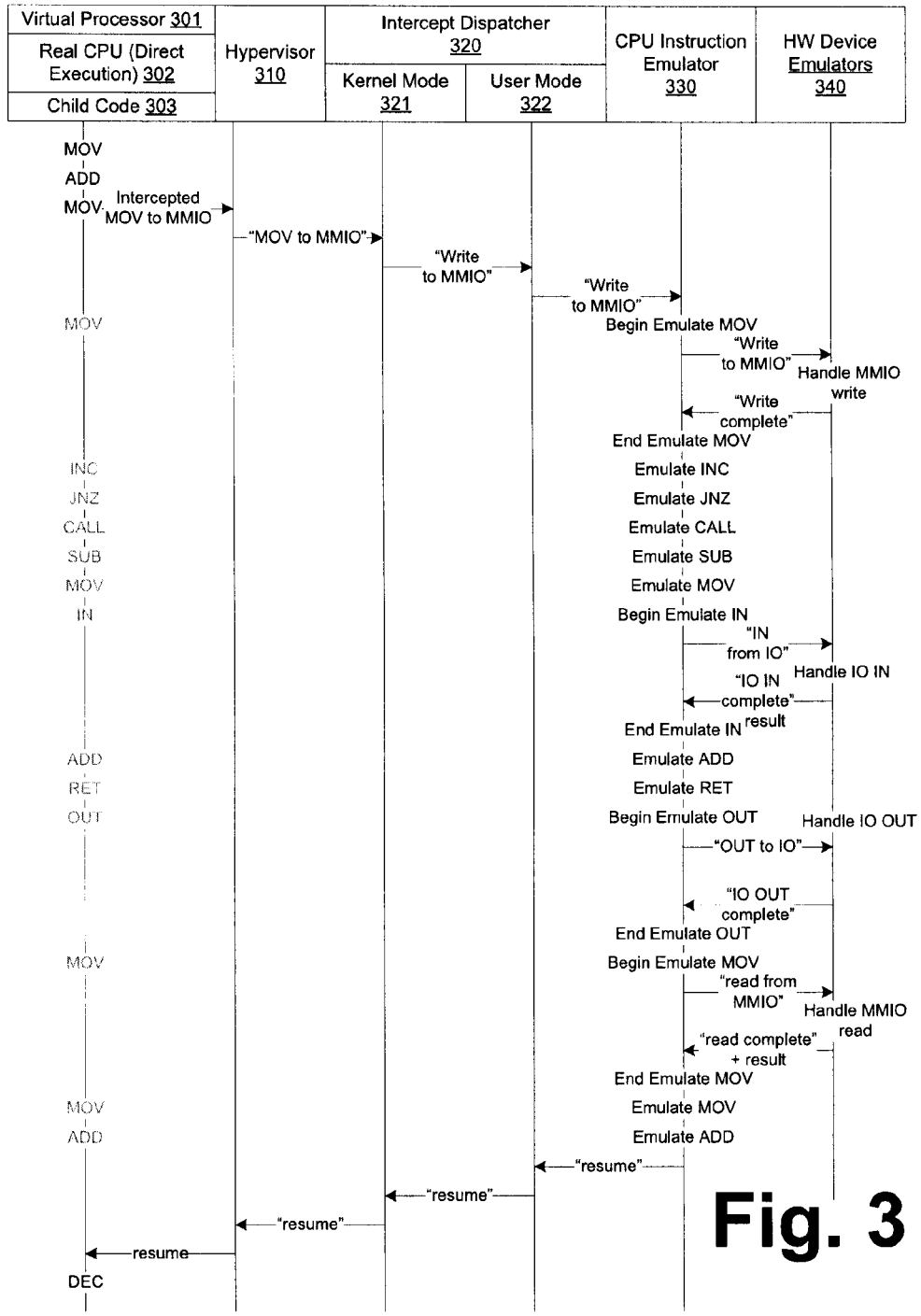
FIG. 3 illustrates an interaction diagram for a sequence of child instructions, using an emulator 122 as illustrated in FIG. 1.

FIG. 2 illustrates an interaction diagram for a sequence of child instructions, without the use of an emulator 122 as illustrated in FIG. 1. In contrast, FIG. 3 illustrates an interaction diagram for a sequence of child instructions, using an emulator 122 as illustrated in FIG. 1.

As can be seen from FIG. 2, components of a system similar to FIG. 1, except without an emulator 122, are laid out across the top of the figure, and actions taken by such elements are illustrated underneath, with time progressing with distance away from the illustrated components. The elements of the system of FIG. 2 comprise the virtual processor 201, real CPU 202, and child code 203. As illustrated, a virtual processor 201 may execute on a real CPU 202, and may in certain circumstances pass child code 203 to direct execution on such CPU 202 as is understood in the art.

The hypervisor 210 has control over the hardware so that it can emulate actions of such hardware without the knowledge of child code 203. For example, if child code issues an instruction to a device, the hypervisor 210 may intercept such instruction and emulate a response back to child code 203 with or without actually causing a device to perform the instruction.

The intercept dispatcher 220 with both kernel mode 221 and user mode 222 handles routing an intercepted instruction to an emulated device 240.

The hardware (HW) device emulators 240 emulate the actions of hardware devices, such as video displays, sound cards, input devices, and so forth.

As can be seen from FIG. 2, without an emulator, the instruction generated by child code 203 is intercepted by the hypervisor and traverses its way to the appropriate emulated device 240. However, the path from 203 to 240 is long and takes time. Once the instruction is processed at 240, the response has to make its way back to 203 for 203 to continue execution. In many hardware access scenarios, and especially in the case of certain graphics devices, such as devices implementing the Video Graphics Array (VGA) standard, repeated access to a same device or device emulator is necessary, causing the system to undergo the long trip back and forth many times in a row.

Referring now to FIG. 3, the invention decreases the cost to transition between execution of child instructions and emulation of hardware device access. The invention does this by including a CPU instruction emulator 330 very "near" the hardware device emulators 340. The various other elements of FIG. 3, namely the virtual processor 310, real CPU, child code 303, hypervisor 310, intercept dispatcher 320 with both kernel mode 321 and user mode 322, and hardware emulators 340 can be substantially similar to the analogous components illustrated in FIG. 2, except that they are appropriately configured to communicate with emulator 330 as necessary.

In an arrangement with an emulator, 330, when child code 303 uses a relatively high proportion of instructions that interact with hardware device emulators 340, the child code 303 can be executed in the CPU instruction emulator 330 rather than incurring the cost of returning to direct execution by 301, only to have the child code 303 almost immediately intercept back to the hardware device emulators 340, which is a relatively high-cost sequence of events.

The CPU instruction emulator 330 begins executing child 303 instructions when a child intercept occurs. The child 303 has not yet executed the instruction that caused the intercept—the CPU instruction emulator 330 emulates that instruction. In emulating the instruction that caused the intercept, the emulator 330 will end up dispatching an access to a hardware device emulator 340, since access to that device is what the intercept was set up to catch. The emulator 330 finishes the first instruction and continues emulating instructions encountered after that first instruction. The following instructions are quite likely to access a hardware device emulator 340 also. If at any point the CPU instruction emulator 330 encounters an instruction or situation that it can't handle, the CPU instruction emulator 330 will return the virtual processor to direct execution on 302. This return to direct execution can also occur for any other reason, including a "timeout", or any heuristic included in the CPU instruction emulator 330.

In one embodiment, to allow the emulator 330 to carry out the emulation activity illustrated in FIG. 3, certain steps are taken to appropriately prepare for and finish emulation. The emulator 330 may make appropriate function calls to retrieve the state of the virtual processor(s) 301, translate child 303 virtual addresses to child physical addresses and/or MMIO handlers, translate IO port numbers to hardware device emulator handlers, open direct apertures from worker process virtual address space to child physical address space, close said apertures, add and remove references to handlers, and push updated virtual processor state to the virtual processor 301 after emulation and before return to direct execution.

The results of these actions may be cached so that repetition is not needed for every emulated instruction. The cost of these actions is thus amortized over the emulation of many instructions. These specific actions may be useful to understand the invention, but these specific actions shouldn't be considered to be the only way to implement the invention. The following is a detailed sequence of actions as may occur in one exemplary embodiment:

1. A child virtual processor is executing child instructions by running the instructions directly on a real CPU processor core.

2. One of the child instructions is a MOV instruction that writes to a destination virtual address that translates to a child physical address that is configured as an MMIO range (an MMIO intercept was previously "installed" at this child physical address).

3. The child MOV instruction causes an intercept into the hypervisor because the destination child physical address is not mapped to child RAM (it's mapped to an MMIO range). More specifically, the intercept into the Hypervisor occurs because the destination child physical address is not already in the shadow page tables—these are the page tables used by the physical CPU while running a child VIRTUAL MACHINE.

4. The hypervisor is unable to populate the shadow page tables with a system physical RAM address to use for the destination address of the MOV because the hypervisor has no child RAM mapping for that child physical address.

5. The hypervisor routes an intercept message to the intercept dispatcher in kernel mode of the root partition for further handling.

6. The root kernel mode intercept dispatcher finds that there is a user-mode MMIO handler registered with a range that covers the destination child physical address of the MOV.

7. The kernel mode intercept dispatcher routes the intercept message to the user-mode intercept dispatcher.

8. The user-mode intercept dispatcher determines (via whatever means) that emulation should be attempted. In the current implementation, this determination is based on a flag specified when the intercept handler was registered.

9. The user-mode intercept dispatcher calls the CPU instruction emulator (instead of calling the hardware device emulator's MMIO handler directly). The virtual processor index is included as information to the emulator in this call.

10. The emulator loads the appropriate virtual processor state—this state includes the instruction pointer address, and the values of all the virtual processor registers that the emulator is capable of dealing with.

11. The emulator translates the instruction pointer address (which is a child virtual address) to a child physical address.

12. The emulator opens a memory aperture to the child physical page(s) corresponding to the child instruction pointer so that the emulator can read the instruction stream bytes directly.

13. The emulator parses the first instruction, which is the MOV that was doing a write to an MMIO range.

14. The emulator caches the results of parsing the instruction in case it is executed again later (before return to direct execution).

15. The emulator begins emulating the MOV instruction.

16. The emulator obtains the appropriate hardware device emulator MMIO handler.

17. The emulator calls the appropriate hardware device emulator MMIO handler, specifying that a memory write is occurring.

18. The hardware device emulator MMIO handler takes appropriate hardware-device-emulator-specific action, such as emulating a write to a hardware register. This may trigger other appropriate actions, and those actions may be synchronous or asynchronous. This same MMIO handler would have been called directly had emulation not been attempted. (Sidenote: had emulation not been attempted, a small amount of instruction completion would have been done on the return path through the kernel mode components in the current implementation. Instruction completion is a bit like emulation, except that completion only completes one instruction. But since emulation is being used, the emulator will finish the instruction, as described below.)

19. The hardware device emulator MMIO handler returns to the emulator.

20. The emulator completes emulation of the MOV instruction.

21. The emulator parses the next instruction, for example an "INC" instruction. This INC instruction doesn't touch memory, only registers.

22. The emulator emulates the INC instruction by incrementing the value the emulator has for one of the general purpose registers of the virtual processor (in order to emulate the effect of an INC instruction).

23. The emulator parses the next instruction, a JNZ.

24. Emulation of the JNZ in this particular case causes the instruction pointer to jump out of the aperture previously opened for reading instruction bytes.

25. The emulator translates the new instruction pointer address, obtaining a child physical address, and opens another aperture to the corresponding child physical page(s) to read more child instruction bytes.

26. The emulator reads and parses the next instruction, a CALL instruction. This particular CALL instruction reads the address to call from a memory location.

27. The emulator opens an aperture to child memory (as before), only this time instead of reading instruction bytes, it reads the target instruction pointer of the CALL instruction from memory using the just-opened aperture.

28. Continue ahead for a while doing the following general things:

a) Each time the emulator needs to read child memory, it starts with a child virtual address, translates that into a child physical address, and then opens a direct aperture to the corresponding child physical page. The emulator can then directly read, write, or do a locked read and modify (or any other type of memory operation) on the child memory. The emulator caches the translations and apertures for increased speed when the same or nearby addresses are used repeatedly as is often the case.

b) Any modifications to child registers are made locally using the values for those registers that the emulator is caching while emulation continues. These values aren't pushed back into the virtual processor until just before return to direct execution.

c) Any instructions that would have caused intercepts to the hardware device emulators are handled by the emulator by generating and delivering the same messages and calls that would have been delivered to the hardware device emulators had the "real" intercepts occurred. These calls happen directly from the emulator instead of involving the dispatcher.

d) The emulator continues emulating until a non-supported case is encountered or until any implementation-specific condition is met (time limit, instruction count limit, etc).

29. When the emulator is done emulating, it notes whether any emulation actually occurred (whether the first instruction, or part of it, was emulated successfully). In this case emulation did occur.

30. Because emulation did occur, the emulator pushes all the virtual processor state back into the virtual processor. This state consists of values for virtual processor registers. This is a call from the emulator to the hypervisor (via layers) informing the hypervisor of the new virtual processor state.

31. The emulator calls the hypervisor (via layers), resuming direct execution of the virtual processor on the real processor. The virtual processor starts at the state that the emulator just pushed back into the virtual processor (including the instruction pointer register).

Exemplary Computing Environment

Figure 4:
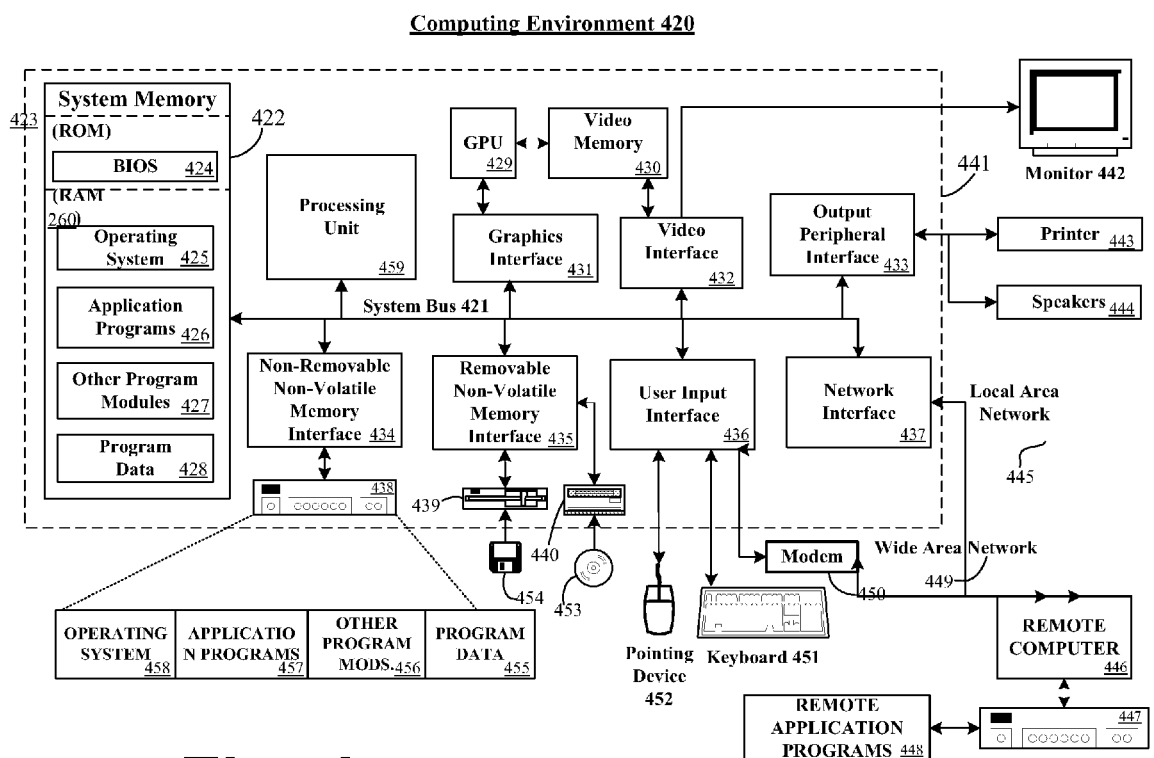
FIG. 4 illustrates a computing device suitable for practicing certain embodiments and aspects of the invention.

FIG. 4 illustrates an exemplary computing environment as may be utilized in connection with embodiments of the invention. The computing system environment 420 is only one example of a suitable computing environment and is not intended to suggest any limitation as to the scope of use or functionality of the invention. Neither should the computing environment 420 be interpreted as having any dependency or requirement relating to any one or combination of components illustrated in the exemplary operating environment 420.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention, such as the processor instruction emulator 122, may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 441. Components of computer 441 may include, but are not limited to, one or more processing units 459 (CPUs), a system memory 422, and a system bus 421 that couples various system components including the system memory to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 441. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted in FIG. 4 include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates remote application programs 448 as residing on memory device 447. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

The invention claimed is:

1. A computer system comprising:
   a processor that operates in a child partition;
   a hypervisor that intercepts device access instructions propagated from said child partition, and routes said device access instructions to a root partition; and
   at least one processor instruction emulator that operates in said root partition, said processor instruction emulator emulating a first device access instruction contained in said device access instructions received from said hypervisor, dispatching thereon, a first access to a hardware device emulator in the root partition, emulating at least one additional device access instruction in said device access instructions, and dispatching a second access to said hardware device emulator without waiting for said child partition to receive a response generated by said hardware device emulator to said first access.

2. The computer system of claim 1, wherein said processor that operates in said child partition is a virtual processor.

3. The computer system of claim 1, further comprising a kernel mode intercept dispatcher in said root partition for routing said device access instructions received from said hypervisor, to said processor instruction emulator.

4. The computer system of claim 1, wherein said processor instruction emulator shares an address space with said hardware device emulator.

5. The computer system of claim 4, wherein said processor instruction emulator is executing on a thread of execution and wherein said processor instruction emulator directly calls said hardware device emulator using the said thread of execution, without switching to a different thread of execution.

6. The computer system of claim 1, wherein said processor instruction emulator continues emulating instructions of said processor that operates in said child partition for a predetermined time interval.

7. The computer system of claim 1, wherein said processor instruction emulator continues emulating instructions of said processor that operates in said child partition until said processor instruction emulator encounters an unsupported instruction.

8. The computer system of claim 1, wherein said processor instruction emulator parses a plurality of instructions for said processor that operates in said child partition.

9. The computer system of claim 1, wherein said processor instruction emulator caches a mapping of a processor instruction emulator address space to a child partition address space.

10. The computer system of claim 1, wherein said processor instruction emulator handles self-modifying code by discarding any parsed instructions and other data derived from instruction bytes previously read from a block of memory, just after emulating an instruction that modifies said block of memory.

11. The computer system of claim 1, wherein the processor instruction emulator emulates at least one user-mode instruction of said processor.

12. A method comprising:
   intercepting, by a hypervisor, device access instructions provided by a processor operating in a child partition;
   routing said device access instructions to a root partition;
   emulating by a processor instruction emulator that operates in said root partition, a first device access instruction of said device access instructions received from said hypervisor, wherein the processor instruction emulator and a device emulator operate in a user mode process;
   dispatching, by said processor instruction emulator, a first access to the device emulator in the root partition;
   subsequently emulating, by said processor instruction emulator, at least one additional device access instruction in said device access instructions, and dispatching a second access to the device emulator without waiting for said child partition to receive a response generated by said device emulator to said first access.

13. The method of claim 12, wherein said processor that operates in said child partition is a virtual processor.

14. The method of claim 12, wherein said device emulator emulates a computer display that implements the Video Graphics Array (VGA) standard.

15. The method of claim 12, further comprising routing said device access instructions to said processor instruction emulator via a kernel mode intercept dispatcher in said root partition.

16. The method of claim 12, wherein said processor instruction emulator shares an address space with said device emulator.

17. The method of claim 16, wherein said processor instruction emulator is executing on a thread of execution and wherein said processor instruction emulator directly calls said device emulator using the said thread of execution, without switching to a different thread of execution.

18. The method of claim 12, wherein said processor instruction emulator continues emulating instructions of said processor that operates in said child partition for a predetermined time interval.

19. The method of claim 12, wherein said processor instruction emulator continues emulating instructions of said processor that operates in said child partition until said processor instruction emulator encounters an unsupported instruction.

20. The method of claim 12, wherein said processor instruction emulator parses a plurality of instructions for said processor that operates in said child partition.

21. The method of claim 12, wherein said processor instruction emulator caches a mapping of a processor instruction emulator address space to a child partition address space.

22. The method of claim 12, wherein said processor instruction emulator handles self-modifying code by discarding any parsed instructions and other data derived from instruction bytes previously read from a block of memory, just after emulating an instruction that modifies said block of memory.

23. A method comprising:
   receiving an intercepted device access instruction that originated in a child partition;
   retrieving a state of a virtual processor executing in said child partition;
   obtaining an address associated with a next instruction of the virtual processor;
   translating a plurality of child partition virtual memory addresses to physical memory addresses;

parsing and storing a plurality of virtual processor instructions;

emulating said device access instruction by a processor instruction emulator that operates in a root partition;

dispatching, by said processor instruction emulator, a first access to a device emulator in the root partition; and subsequently emulating, by said processor instruction emulator, at least one next device access instruction of said virtual processor without waiting for said child partition to receive a response generated by said device emulator to said first access.

* * * * *

UNITED STATES PATENT AND TRADEMARK OFFICE
CERTIFICATE OF CORRECTION

| | |
|---|---|
| PATENT NO. | : 8,145,470 B2 |
| APPLICATION NO. | : 11/769510 |
| DATED | : March 27, 2012 |
| INVENTOR(S) | : Dustin L. Green |

Page 1 of 1

It is certified that error appears in the above-identified patent and that said Letters Patent is hereby corrected as shown below:

Title page, in field (54) and in Column 1, line 1, Title, after "ACCESS" insert -- TO --.

Signed and Sealed this
Ninth Day of October, 2012

David J. Kappos
*Director of the United States Patent and Trademark Office*